United States Patent [19]

Ida

[11] 4,274,116
[45] Jun. 16, 1981

[54] TAPE RECORDER
[75] Inventor: Masatoshi Ida, Tokyo, Japan
[73] Assignee: Olympus Optical Co., Ltd., Tokyo, Japan
[21] Appl. No.: 927,831
[22] Filed: Jul. 25, 1978
[30] Foreign Application Priority Data Jul. 29, 1977 [JP] Japan .................................. 52-91174

[51] Int. Cl.³ ............................ G11B 5/45; G11B 5/02
[52] U.S. Cl. ........................................ 360/65; 360/66; 360/68
[58] Field of Search ......................... 360/65, 66, 68, 73

[56] References Cited
U.S. PATENT DOCUMENTS

| | | | |
|---|---|---|---|
| 3,465,321 | 9/1969 | Reisfeld | 360/65 |
| 3,798,673 | 3/1974 | Koinuma | 360/66 |
| 4,011,585 | 3/1977 | Sunaga | 360/66 |
| 4,038,692 | 7/1977 | Umeda et al. | 360/66 |

Primary Examiner—Vincent P. Canney
Attorney, Agent, or Firm—Toren, McGeady and Stanger

[57] ABSTRACT

A tape recorder having a tape speed changing mechanism comprises a magnetic recording and reproducing head, an oscillation circuit connected to the head, an equalizing circuit connected to the oscillation circuit, means for changing an AC bias in response to a tape speed in accordance with a reference voltage which is switched by a speed changing switch of a motor and means for changing a circuit constant of the equalization circuit by a switch which is interlocked with the speed changing switch.

9 Claims, 4 Drawing Figures

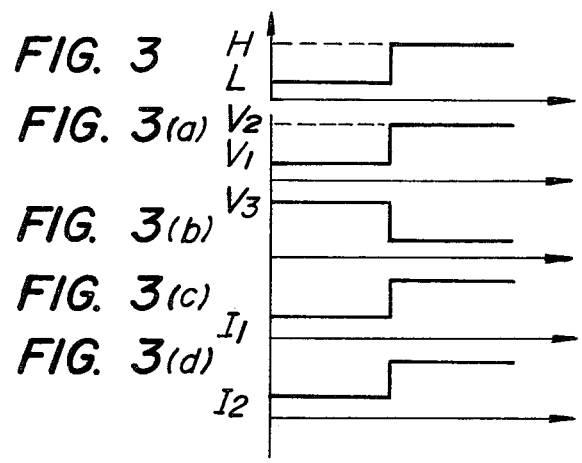
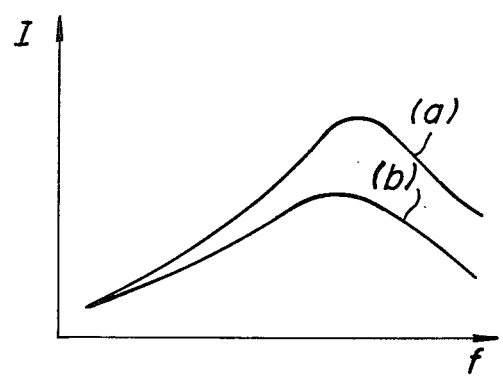

TAPE RECORDER

BACKGROUND OF THE INVENTION

1. Field of the Invention

The present invention relates to a tape recorder which can switch the tape speed.

2. Description of the Prior Art

This kind of tape recorder includes a recording circuit having the construction shown in FIG. 1. That is, an oscillation block OSCB is connected to a magnetic head HD. In the oscillation block OSCB one end of a primary winding of an oscillation transformer T is connected to a base of a transistor Tr through a resistor $R_1$, and the other end of the primary winding is connected to a collector of the same transistor Tr. The transistor Tr also has an emitter connected to ground. A capacitor $C_1$, is connected between both terminals of a secondary winding of the oscillation transformer T, and one end of the parallel combination of the secondary winding and the capacitor is connected to the head HD and the other end thereof is connected to the emitter of the transistor tr through a capacitor $C_2$.

A center tap of the primary winding of the oscillation transformer T is connected to a power supply source (not shown) through a bias resistance BR. The bias resistance BR is composed of resistors $R_2$ and $R_3$. When the tape speed is 1.2 cm/sec the resistance $R_2$ is only used, and when the tape speed is 2.4 cm/sec, a parallel combination of the resistance $R_2$ and the resistance $R_3$ is used, so as to generate the optimum AC bias from the oscillation block OSCB. The switching of the resistances $R_2$ and $R_3$ in this case is carried out by a switch $SW_2$ interlocked with a motor speed switch $SW_1$ of a motor circuit MT.

The oscillation block OSCB is connected to an output terminal of a final stage amplifier AMP through an equalizing circuit EQ. The equalizing circuit EQ consists of a parallel combination of a resistance $R_4$ and a capacitor $C_3$ and a resistance $R_5$ directly connected thereto and sets at a certain constant.

With such construction, the optimum AC bias for a tape speed can be obtained, and in this state, a recording output of the amplifier AMP is supplied to the head HD through the equalizing circuit EQ, and the recording is carried out.

However, in such a construction, since a circuit constant of the equalizing circuit EQ is made constant, when the tape speed is 1.2 cm/sec and 2.4 cm/sec, the frequency characteristic becomes different, particularly when the tape speed is 2.4 cm/sec, the frequency characteristic is extended to a higher zone to produce a strain in a high tone, and as a result, the tone quality is disadvantageously different as compared with the case of 1.2 cm/sec.

Therefore, in accordance with the tape speed, the circuit constant of the equalizing circuit is switched for the purpose of making the tone quality uniform. However, an extra switch is required, and if this switch is further interlocked with the above switches $SW_1$ and $SW_2$, the switch construction becomes large.

This fact is unfavorable particularly for a super-miniature tape recorder in which parts should be minimized.

SUMMARY OF THE INVENTION

An object of the present invention is to eliminate the above described defects of the conventional tape recorder.

Another object of the present invention is to provide a tape recorder which can switch equalizing characteristic in accordance with a tape speed without increasing the numbers of switch and makes the tone quality uniform.

According to the present invention, a tape recorder having a tape speed changing mechanism comprises a magnetic recording and reproducing head, an oscillation circuit connected to the head, an equalizing circuit connected to the oscillation circuit, means for changing an AC bias in response to a tape speed in accordance with a reference voltage which is switched by a speed changing switch of a motor and means for changing a circuit constant of the equalizing circuit by a switch which is interlocked with the speed changing switch.

BRIEF DESCRIPTION OF THE DRAWING

FIG. 3 is a wave-form diagram showing an operation of the tape recorder shown in FIG. 2; and FIG. 4 shows an equalizing characteristic for explaining the equalizing circuit used in the tape recorder according to the present invention.

DESCRIPTION OF THE PREFERRED EMBODIMENT

Figure 1:
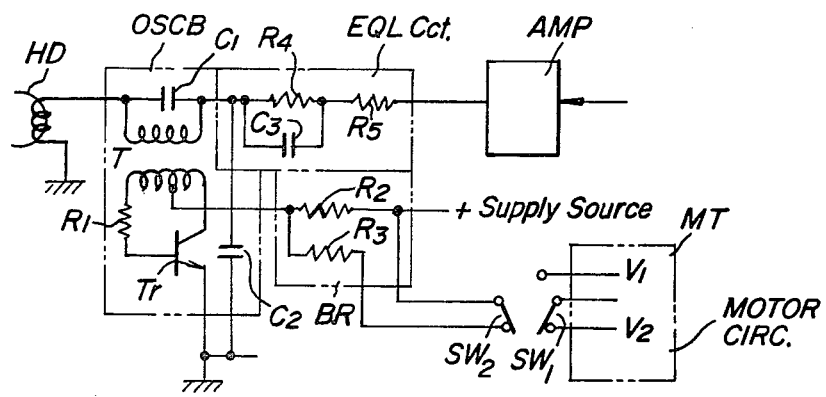
FIG. 1 is a circuit diagram showing a recording circuit of a conventional tape recorder.
Figure 2:
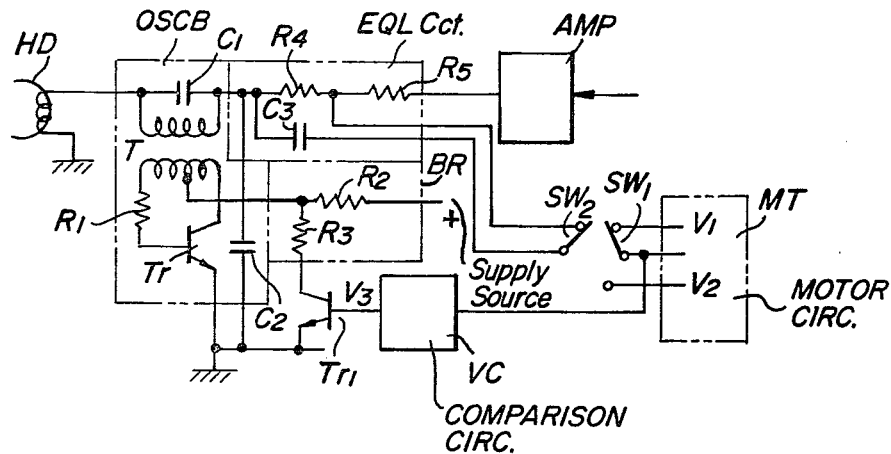
FIG. 2 is a circuit diagram showing one embodiment of a recording circuit of a tape recorder according to the present invention.

Referring now to FIG. 2, one embodiment of a tape recorder according to the present invention will be described. In FIGS. 1 and 2, like parts are designated by like numerals. In the embodiment of FIG. 2, the equalizing circuit EQ is made by connecting the capacitor $C_3$ to both ends of the resistance $R_4$ among a series combination of the resistances $R_4$ and $R_5$ through the switch $SW_2$. This switch $SW_2$ is interlocked with the speed changing switch $SW_1$ of the motor circuit MT, which will be explained later on. The switch $SW_2$ closes when the tape speed is 1.2 cm/sec and opens when the tape speed is 2.4 cm/sec so as to switch the circuit constant of the equalizing circuit in accordance with the tape speed.

The bias resistance BR comprises the resistance $R_2$ connected between the center tap of the primary winding of the oscillation transformer T and the power supply source (not shown), and the connection point of the center tap and the resistance $R_2$ is grounded through the resistance $R_3$ and transistor $Tr_1$.

The speed changing switch $SW_1$ of the motor circuit MT is switched in accordance with the tape speed, so that in order to obtain a motor speed L corresponding thereto when the tape speed is 1.2 cm/sec, a reference voltage $V_1$ shown in FIG. 3a when the tape speed is 2.4 cm/sec and a reference voltage $V_2$ ($>V_1$) shown in FIG. 3a in order to obtain the motor speed H corresponding thereto are generated, respectively.

To the switch $SW_1$ is connected a voltage comparison circuit VC. The voltage comparison circuit VC generates an output $V_3$ shown in FIG. 3b in response to the time when the reference voltage $V_1$ or $V_2$ is given and controls ON-OFF of the transistor $Tr_1$. The other construction is same as in FIG. 1 and omitted.

The operation of the tape recorder according to the present invention is explained hereinafter. At first, when the tape speed is 1.2 cm/sec, the switches $SW_1$ and $SW_2$ are operated as illustrated. Then, the reference voltage $V_1$ for obtaining the tape speed of 1.2 cm/sec is generated from the switch $SW_1$, and an output $V_3$ shown in FIG. 3b corresponding thereto is generated from the comparison circuit VC. Therefore, the transistor $Tr_1$ is ON, a current $I_1$ flowing to the oscillation block OSCB is shunted through the resistance $R_3$ and thus reduced as shown in FIG. 3c, so that, to the head HD is given an AC bias $I_2$ shown in FIG. 3d which is optimum to the tape speed of 1.2 cm/sec.

In the equalizing circuit EQ, the capacitor $C_3$ is connected to the resistance $R_4$ in parallel by means of the switch $SW_2$, so that a compensation amount of recording is increased and the drop of frequency characteristic is checked as shown in FIG. 4a.

When the tape speed is 2.4 cm/sec, the switches $SW_1$ and $SW_2$ are interlocked with each other, and operated by switching from the state illustrated. Then, the reference voltage $V_2$ for obtaining the tape speed of 2.4 cm/sec is generated from the switch $SW_1$, and the output $V_3$ shown in FIG. 3b corresponding thereto is generated from the voltage comparison circuit VC. The transistor $Tr_1$ is OFF and the current $I_1$ flowing to the oscillation block OSCB is increased by its amount as shown in FIG. 3c, so that an AC bias shown in FIG. 3d which is optimum to the tape speed of 2.4 cm/sec is supplied to the head HD.

In the equalizing circuit EQ, the capacitor $C_3$ is separated by opening the switch $SW_2$, so that the compensation amount of recording is reduced and the frequency characteristic is lowered as shown in FIG. 4b.

Accordingly, in that state, among the output frequencies of the amplifier AMP, the extreme rise of the higher range is checked, thereby making the tone quality almost uniform as in the case of the tape speed of 1.2 cm/sec.

Thus, according to such construction, the switching of the AC bias in accordance with the tape speed can be carried out by utilizing the speed changing switch, and the equalizing characteristic is also switched by the switch interlocked with the speed changing switch, so that even with the special function added, the number of switches is not increased as compared with prior tape recorders and the enlargement of the switch can be prevented. Further, as described above, the optimum equalizing characteristic in accordance with the tape speed can be obtained by switching the equalizing circuit, so that the extreme rise of the higher range when the tape speed is 2.4 cm/sec can be prevented. This limits the influence of the tape speed and making the tone quality uniform.

In addition, the present invention is not limited to the above embodiments but may be modified within its scope without departing from the essential feature.

As described above, according to the invention, it is possible to provide a tape recorder which can switch the equalizing characteristic in accordance with the tape speed without increasing the number of switch and make the tone quality uniform.

What is claimed is:

1. A tape recorder having a tape speed changing mechanism and comprising a magnetic recording and reproducing head, an oscillation circuit connected to the head, an equalizing circuit connected to the oscillation circuit, a biasing circuit connected to the oscillation circuit, a motor control circuit for setting a motor speed, a speed changing switch connected to the motor control circuit for changing the motor speed, a second switch interlocked with the speed changing switch, characterized in changing means for changing the bias of the biasing circuit in accordance with the position of the speed changing switch and for changing the frequency characteristics of the equalizing circuit in response to the second switch which is interlocked with the speed changing switch, said changing means including a transistor responsive to the position of said speed changing switch for grounding a portion of the current in said biasing circuit, said speed changing switch when in one position exhibiting one of the voltages in said motor control circuit and when in the other position exhibiting another voltage of said motor control circuit, said transistor responding to the voltage at said switch, a comparison circuit connected to the speed changing switch for sensing the voltage at the speed changing switch and connected to the transistor for varying the conductivity of the transistor.

2. An apparatus as in claim 1, wherein said biasing circuit includes a capacitor and said changing means connects and disconnects the capacitor.

3. An apparatus as in claim 1, wherein said biasing circuit includes a capacitor and said changing means connects and disconnects the capacitor.

4. An apparatus as in claim 3, wherein said biasing means includes a pair of resistors, one of said resistors being connectable to a supply source and the other of said resistors being connected to the transistor.

5. An apparatus as in claim 1, wherein said biasing means includes a pair of resistors, one of said resistors being connectable to a supply source and the other of said resistors being connected to the transistor.

6. An apparatus as in claim 1, wherein said biasing means includes a pair of resistors, one of said resistors being connectable to a supply source and the other of said resistors being connected to the transistor.

7. An apparatus as in claim 1, wherein said speed changing switch, when in one position, exhibits one voltage of the motor control circuit and when in the other position exhibits another voltage of the motor control circuit.

8. An apparatus as in claim 1, wherein said speed changing switch is manually selectable and by interlocking with the second switch simultaneously and selectively changes the motor speed, the bias of the biasing circuit, and the frequency characteristic of the equalizing circuit.

9. An apparatus as in claim 1, wherein said speed changing switch selects one voltage and another voltage in said motor depending on the desired speed, and simultaneously applies the selected voltage to the biasing circuit.

* * * * *